United States Patent
Patel et al.

(10) Patent No.: US 11,392,465 B2
(45) Date of Patent: Jul. 19, 2022

(54) METHOD AND SYSTEM FOR MANAGING A SPARE FAULT DOMAIN IN A MULTI-FAULT DOMAIN DATA CLUSTER

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 146 days.

(21) Appl. No.: 16/810,923

(22) Filed: Mar. 6, 2020

(65) Prior Publication Data

US 2021/0279152 A1 Sep. 9, 2021

(51) Int. Cl.
- *G06F 11/20* (2006.01)
- *G06F 11/14* (2006.01)
- *G06F 3/06* (2006.01)
- *G06F 11/10* (2006.01)

(52) U.S. Cl.
CPC ......... *G06F 11/2092* (2013.01); *G06F 3/064* (2013.01); *G06F 3/067* (2013.01); *G06F 3/0619* (2013.01); *G06F 11/1076* (2013.01); *G06F 11/1407* (2013.01); *G06F 11/1435* (2013.01); *G06F 11/1471* (2013.01)

(58) Field of Classification Search
CPC ............. G06F 11/2092; G06F 11/1407; G06F 11/1435; G06F 11/1471; G06F 11/1076; G06F 3/0619; G06F 3/064; G06F 3/067
See application file for complete search history.

(56) References Cited

U.S. PATENT DOCUMENTS

| | | | |
|---|---|---|---|
| 4,780,809 A | 10/1988 | Woffinden et al. |
| 5,689,678 A | 11/1997 | Stallmo et al. |
| 6,098,098 A | 8/2000 | Sandahi et al. |
| 6,223,252 B1 | 4/2001 | Bandera et al. |
| 6,516,425 B1 | 2/2003 | Belhadj et al. |
| 7,636,814 B1 | 12/2009 | Karr et al. |
| 7,882,386 B1 | 2/2011 | Potnis et al. |
| 7,987,353 B2 | 7/2011 | Holdaway et al. |

(Continued)

FOREIGN PATENT DOCUMENTS

WO 2015114643 A1 8/2015

OTHER PUBLICATIONS

"Features—RoboHead"; Project Management Software for Marketing & Creative Teams, Aquent; 2018 (https://www.robohead.net/features) (1 pages).

(Continued)

*Primary Examiner* — Jigar P Patel
(74) *Attorney, Agent, or Firm* — Chamberlain, Hrdlicka, White, Williams & Aughtry

(57) ABSTRACT

In general, the invention relates to a method for managing data. The method includes detecting a fault domain failure in a fault domain of a plurality of fault domains, and in response to the detecting, initiating a rebuilding of data in a spare fault domain of using checkpoint metadata and slice metadata, wherein the data is a copy of data that was stored in the fault domain and wherein the spare fault domain is not one of the plurality of fault domains.

17 Claims, 11 Drawing Sheets

(56) References Cited

U.S. PATENT DOCUMENTS

| | | |
|---|---|---|
| 8,037,345 B1 | 10/2011 | Iyer et al. |
| 8,099,571 B1 | 1/2012 | Driscoll et al. |
| 8,161,255 B2 | 4/2012 | Anglin et al. |
| 8,190,835 B1 | 5/2012 | Yueh |
| 8,364,917 B2 | 1/2013 | Bricker et al. |
| 8,386,930 B2 | 2/2013 | Dillenberger et al. |
| 8,583,769 B1 | 11/2013 | Peters et al. |
| 8,788,466 B2 | 7/2014 | Anglin et al. |
| 8,868,987 B2 | 10/2014 | Wagner |
| 8,874,892 B1 | 10/2014 | Chan et al. |
| 8,898,114 B1 | 11/2014 | Feathergill et al. |
| 8,949,208 B1 | 2/2015 | Xu et al. |
| 9,122,501 B1 | 9/2015 | Hsu et al. |
| 9,201,751 B1 | 12/2015 | Muthirisavenugopal et al. |
| 9,256,378 B2 | 2/2016 | Zheng et al. |
| 9,256,381 B1 | 2/2016 | Fultz et al. |
| 9,278,481 B2 | 3/2016 | Hull |
| 9,355,036 B2 | 5/2016 | Beard et al. |
| 9,521,198 B1 | 12/2016 | Agarwala et al. |
| 9,696,939 B1 | 7/2017 | Frank et al. |
| 9,710,367 B1 | 7/2017 | Nagineni |
| 9,749,480 B1 | 8/2017 | Katano |
| 9,792,316 B1 | 10/2017 | Cremelie |
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,013,323 B1 | 7/2018 | Puhov et al. |
| 10,013,325 B1 | 7/2018 | Garrett, Jr. et al. |
| 10,031,672 B2 | 7/2018 | Wang et al. |
| 10,057,184 B1 | 8/2018 | Prahlad et al. |
| 10,091,295 B1 | 10/2018 | Savic et al. |
| 10,097,620 B2 | 10/2018 | Reddy et al. |
| 10,152,254 B1 | 12/2018 | Kang et al. |
| 10,185,624 B2 | 1/2019 | Akutsu et al. |
| 10,241,695 B2 | 3/2019 | Baptist et al. |
| 10,339,455 B1 | 7/2019 | Parush-Tzur et al. |
| 10,409,778 B1 | 9/2019 | Zhao et al. |
| 10,452,301 B1 | 10/2019 | Farhan |
| 10,503,413 B1 | 12/2019 | Gal et al. |
| 10,503,611 B1 | 12/2019 | Srivastav et al. |
| 10,528,429 B1 * | 1/2020 | Vempati .............. G06F 11/1435 |
| 10,817,392 B1 | 10/2020 | Mcauliffe et al. |
| 10,929,256 B2 | 2/2021 | Danilov et al. |
| 10,956,601 B2 | 3/2021 | Surla et al. |
| 10,963,345 B2 | 3/2021 | Patel et al. |
| 10,990,480 B1 | 4/2021 | Bernat et al. |
| 11,005,468 B1 | 5/2021 | Subramanian |
| 11,112,990 B1 | 9/2021 | Bernat et al. |
| 2001/0044879 A1 | 11/2001 | Moulton et al. |
| 2003/0036882 A1 | 2/2003 | Harper et al. |
| 2003/0058277 A1 | 3/2003 | Bowman-Amuah |
| 2003/0065873 A1 | 4/2003 | Collins et al. |
| 2003/0172145 A1 | 9/2003 | Nguyen |
| 2003/0177205 A1 | 9/2003 | Liang et al. |
| 2004/0128587 A1 | 7/2004 | Kenchammana-Hosekote et al. |
| 2004/0153844 A1 | 8/2004 | Ghose et al. |
| 2004/0260967 A1 | 12/2004 | Guha et al. |
| 2005/0076049 A1 | 4/2005 | Qubti et al. |
| 2005/0086557 A1 | 4/2005 | Sato et al. |
| 2005/0182797 A1 | 8/2005 | Adkins et al. |
| 2005/0262385 A1 | 11/2005 | Mcneill et al. |
| 2005/0283655 A1 | 12/2005 | Ashmore |
| 2007/0214255 A1 | 9/2007 | Spitz et al. |
| 2007/0283011 A1 | 12/2007 | Rakowski et al. |
| 2008/0244204 A1 | 10/2008 | Cremelie et al. |
| 2008/0282105 A1 | 11/2008 | Deenadhayalan et al. |
| 2009/0077165 A1 | 3/2009 | Rhodes et al. |
| 2009/0094250 A1 | 4/2009 | Dhuse et al. |
| 2009/0235022 A1 | 9/2009 | Bates et al. |
| 2009/0254572 A1 | 10/2009 | Redlich et al. |
| 2009/0265360 A1 | 10/2009 | Bachwani et al. |
| 2010/0061207 A1 | 3/2010 | Trantham |
| 2010/0138604 A1 | 6/2010 | Noguchi et al. |
| 2010/0241616 A1 | 9/2010 | Murphy et al. |
| 2011/0099351 A1 | 4/2011 | Condict |
| 2011/0173484 A1 | 7/2011 | Schuette et al. |
| 2011/0197024 A1 | 8/2011 | Thomas |
| 2011/0246597 A1 | 10/2011 | Swanson et al. |
| 2011/0302446 A1 | 12/2011 | Becker-szendy et al. |
| 2012/0096309 A1 | 4/2012 | Kumar et al. |
| 2013/0047029 A1 | 2/2013 | Ikeuchi et al. |
| 2013/0067459 A1 | 3/2013 | Sannidhanam et al. |
| 2013/0086006 A1 | 4/2013 | Colgrove |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0032834 A1 | 1/2014 | Cudak et al. |
| 2014/0059311 A1 | 2/2014 | Oberhofer et al. |
| 2014/0089265 A1 | 3/2014 | Talagala et al. |
| 2014/0089630 A1 | 3/2014 | Pignatelli |
| 2014/0282824 A1 | 9/2014 | Lango et al. |
| 2014/0285917 A1 | 9/2014 | Cudak et al. |
| 2014/0297603 A1 | 10/2014 | Kim et al. |
| 2015/0012775 A1 | 1/2015 | Cudak et al. |
| 2015/0046756 A1 | 2/2015 | Sreekumaran et al. |
| 2015/0058582 A1 | 2/2015 | Baldwin et al. |
| 2015/0095596 A1 | 4/2015 | Yang |
| 2015/0161000 A1 | 6/2015 | Kim et al. |
| 2015/0205657 A1 | 7/2015 | Clark |
| 2015/0205669 A1 | 7/2015 | Sundaram et al. |
| 2015/0220400 A1 | 8/2015 | Resch et al. |
| 2015/0227602 A1 | 8/2015 | Ramu et al. |
| 2015/0286545 A1 | 10/2015 | Brown |
| 2015/0355980 A1 | 12/2015 | Volvovski et al. |
| 2015/0379430 A1 | 12/2015 | Dirac et al. |
| 2016/0013988 A1 | 1/2016 | Andrews |
| 2016/0057226 A1 | 2/2016 | Bestler et al. |
| 2016/0062674 A1 | 3/2016 | Benight et al. |
| 2016/0070652 A1 | 3/2016 | Sundararaman et al. |
| 2016/0077933 A1 * | 3/2016 | Ventura ............... G06F 11/2023 |
| | | 714/4.1 |
| 2016/0085630 A1 | 3/2016 | Gardner |
| 2016/0170871 A1 | 6/2016 | Hyun et al. |
| 2016/0246537 A1 | 8/2016 | Kim |
| 2016/0313916 A1 | 10/2016 | Sivananainthaperumal et al. |
| 2016/0334998 A1 | 11/2016 | George et al. |
| 2017/0031761 A1 * | 2/2017 | Horan ................. H04L 67/1097 |
| 2017/0090767 A1 | 3/2017 | Poston et al. |
| 2017/0099187 A1 | 4/2017 | Dale et al. |
| 2017/0147437 A1 | 5/2017 | Bodick et al. |
| 2017/0160983 A1 | 6/2017 | Fiske et al. |
| 2017/0192865 A1 | 7/2017 | Pan |
| 2017/0192868 A1 | 7/2017 | Vijayan et al. |
| 2017/0199893 A1 | 7/2017 | Aronovich et al. |
| 2017/0206034 A1 | 7/2017 | Fetik |
| 2017/0235609 A1 | 8/2017 | Wires et al. |
| 2017/0262185 A1 | 9/2017 | Long et al. |
| 2017/0308436 A1 | 10/2017 | Agombar et al. |
| 2018/0018227 A1 | 1/2018 | Kazi |
| 2018/0018235 A1 | 1/2018 | Arslan et al. |
| 2018/0060894 A1 | 3/2018 | Beveridge et al. |
| 2018/0101305 A1 | 4/2018 | Kazi et al. |
| 2018/0157532 A1 | 6/2018 | Kumar et al. |
| 2018/0165169 A1 | 6/2018 | Camp et al. |
| 2018/0189109 A1 | 7/2018 | Nagai et al. |
| 2018/0205785 A1 | 7/2018 | Caulfield et al. |
| 2018/0217898 A1 | 8/2018 | Tormasov |
| 2018/0260123 A1 | 9/2018 | Andresen et al. |
| 2018/0278597 A1 | 9/2018 | Helms et al. |
| 2018/0284987 A1 | 10/2018 | Lazier |
| 2018/0285887 A1 | 10/2018 | Maung |
| 2018/0307560 A1 | 10/2018 | Vishnumolakala et al. |
| 2018/0314607 A1 * | 11/2018 | Deshpande ............. G06F 16/28 |
| 2018/0322558 A1 | 11/2018 | Padmanabh et al. |
| 2018/0356998 A1 | 12/2018 | Wu et al. |
| 2019/0050263 A1 | 2/2019 | Patel et al. |
| 2019/0104398 A1 | 4/2019 | Owen et al. |
| 2019/0108099 A1 | 4/2019 | Mazumdar |
| 2019/0109772 A1 | 4/2019 | Lipstone et al. |
| 2019/0197023 A1 | 6/2019 | Chennamsetty et al. |
| 2019/0332473 A1 | 10/2019 | Yang et al. |
| 2019/0332502 A1 | 10/2019 | Ma et al. |
| 2019/0361850 A1 | 11/2019 | Uno et al. |
| 2019/0379588 A1 | 12/2019 | Rao |

(56) References Cited

U.S. PATENT DOCUMENTS

| | | |
|---|---|---|
| 2020/0026439 A1 | 1/2020 | Gao et al. |
| 2020/0034257 A1* | 1/2020 | Mahmood ............. G06F 11/008 |
| 2020/0042388 A1 | 2/2020 | Roberts |
| 2020/0050689 A1 | 2/2020 | Tal et al. |
| 2020/0065191 A1 | 2/2020 | Zhou |
| 2020/0133503 A1 | 4/2020 | Sun et al. |
| 2020/0175038 A1 | 6/2020 | Guan et al. |
| 2020/0201837 A1 | 6/2020 | Motwani et al. |
| 2020/0257457 A1 | 8/2020 | Matsugami et al. |

OTHER PUBLICATIONS

"Make more time for the work that matters most"; Asana, Inc.; 2017 (https://asana.com/) (7 pages).
"Online Project Management Tools & Features"; ProWorkflow; Jun. 2015 (https://www.proworkflow.com/features-project-management-tools/) (7 pages).
Extended European Search Report issued in corresponding European Application No. 20152194.5, dated Jun. 29, 2020 (10 pages).
Extended European Search Report issued in corresponding European Application No. 20152195.2, dated Jun. 2, 2020 (6 pages).
Suzhen Wu et al. ;"Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028) (10 pages).

\* cited by examiner

METHOD AND SYSTEM FOR MANAGING A SPARE FAULT DOMAIN IN A MULTI-FAULT DOMAIN DATA CLUSTER

BACKGROUND

Computing devices may include any number of internal components such as processors, memory, and persistent storage. Each of the internal components of a computing device may be used to generate data. The process of generating and storing data may utilize computing resources of the computing devices such as processing and storage.

SUMMARY

In general, in one aspect, the invention relates to a method for managing data. The method includes detecting a fault domain failure in a fault domain of a plurality of fault domains, and in response to the detecting, initiating a rebuilding of data in a spare fault domain using checkpoint metadata and slice metadata, wherein the data is a copy of data that was stored in the fault domain and wherein the spare fault domain is not one of the plurality of fault domains.

In general, in one aspect, the invention relates to a system that includes a processor and a data processor, which when executed by the processor performs a method. The method comprises detecting a fault domain failure in a fault domain of a plurality of fault domains, and in response to the detecting, initiating a rebuilding of data in a spare fault domain using checkpoint metadata and slice metadata, wherein the data is a copy of data that was stored in the fault domain and wherein the spare fault domain is not one of the plurality of fault domains.

In general, in one aspect, the invention relates to a non-transitory computer readable medium which includes computer readable program code, which when executed by a computer processor enables the computer processor to perform a method. The method includes detecting a fault domain failure in a fault domain of a plurality of fault domains, and in response to the detecting, initiating a rebuilding of data in a spare fault domain using checkpoint metadata and slice metadata, wherein the data is a copy of data that was stored in the fault domain and wherein the spare fault domain is not one of the plurality of fault domains.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for storing data and metadata in a data cluster. More specifically, embodiments of the invention relate to proactively protecting data stored in a data cluster using checkpoint zones (see e.g., FIG. 3A). Checkpoint zone operations may include preemptively copying and sending a subset of data stored on fault domains in the data cluster to a spare fault domain. This preemptively copied data may be used to improve the rebuilding operations (see e.g., FIG. 3B) of failed fault domains.

Figure 1A:
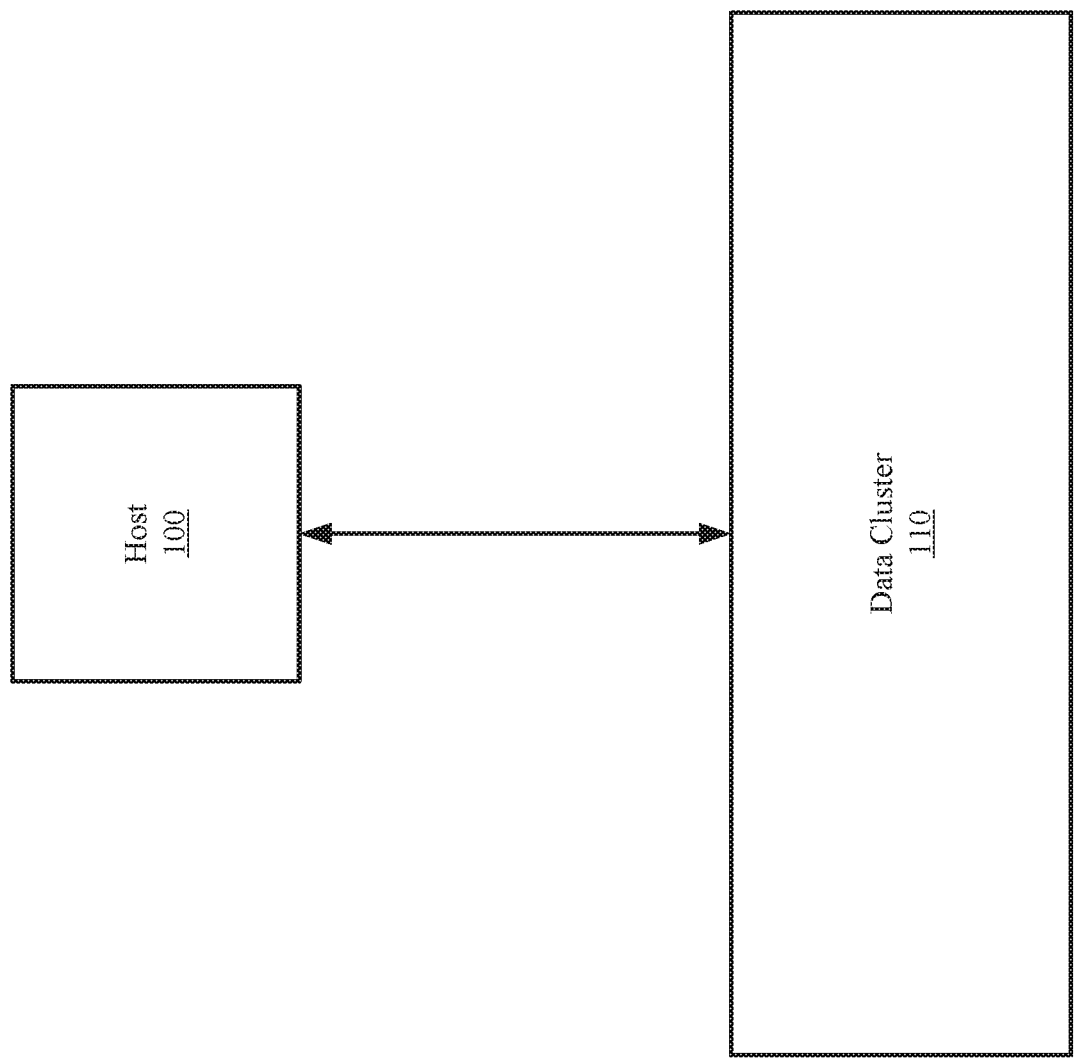
FIG. 1A shows a diagram of a system in accordance with one or more embodiments of the invention.

FIG. 1A shows an example system in accordance with one or more embodiments of the invention. The system includes a host (100) and a data cluster (110). The host (100) is operably connected to the data cluster (110) via any combination of wired and/or wireless connections.

In one or more embodiments of the invention, the host (100) utilizes the data cluster (110) to store data. The data stored may be backups of databases, files, applications, and/or other types of data without departing from the invention.

Figure 5:
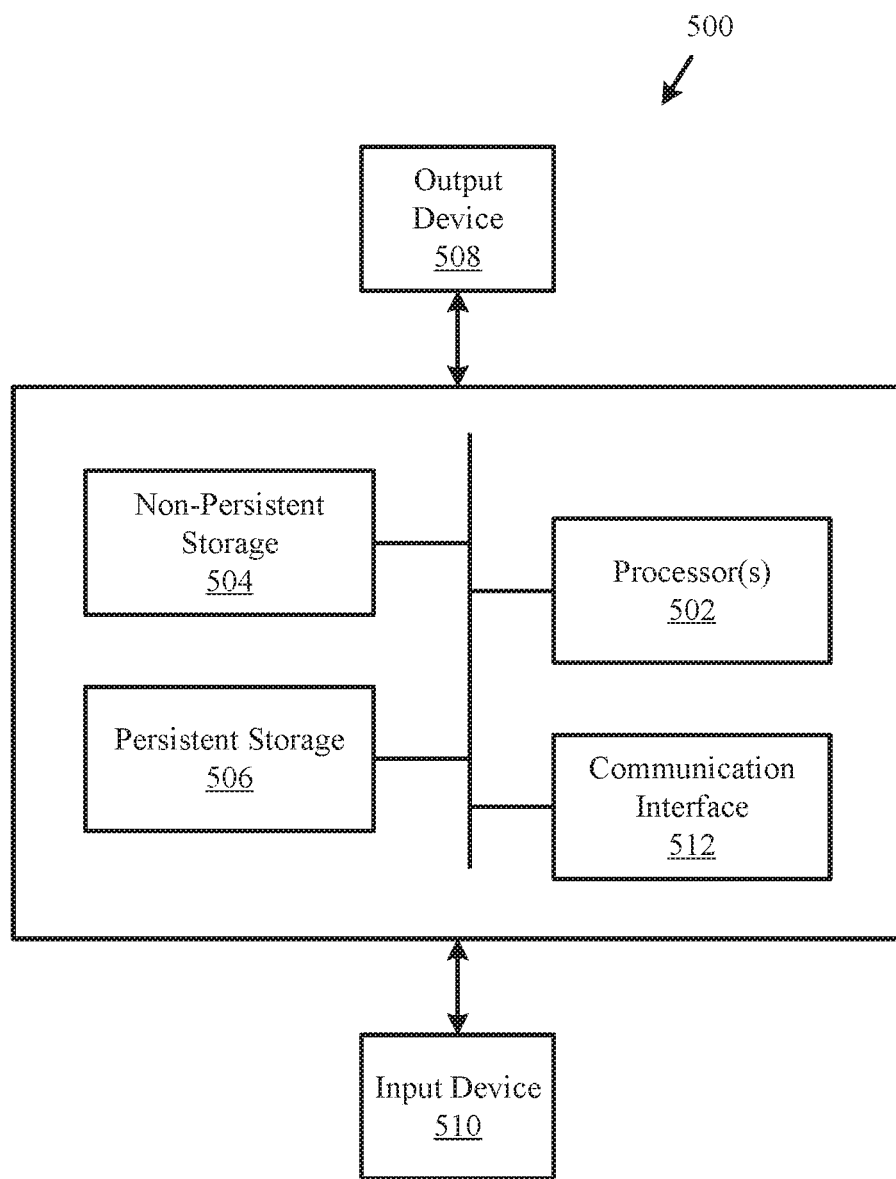
FIG. 5 shows a computing system in accordance with one or more embodiments of the invention.

In one or more embodiments of the invention, the host (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data cluster (110) stores data, metadata, and/or backups of data generated by the host (100). The data and/or backups may be deduplicated versions of data obtained from the host. The data cluster may, via an erasure coding procedure, store portions of the deduplicated data across fault domains operating in the data cluster (110).

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

In one or more embodiments of the invention, an erasure coding procedure includes dividing the obtained data into portions, referred to as data chunks. Each data chunk may include any number of data segments associated with the obtained data. The individual data chunks may then be combined (or otherwise grouped) into data slices (also referred to as Redundant Array of Independent Disks (RAID) slices). One or more parity values are then calculated for each of the aforementioned slices. The number of parity values may vary based on the erasure coding algorithm that is being used as part of the erasure coding procedure. The chunks of a data slice may then be stored across different fault domains in a data cluster. Any chunk within a data slice may be reconstructed using the other chunks in the data slice. Non-limiting examples of erasure coding algorithms are RAID-3, RAID-4, RAID-5, and RAID-6. Other erasing coding algorithms may be used without departing from the invention.

Continuing with the discussion of FIG. 1A, the data cluster (110) may include persistent storage devices found within fault domains that each store any number of portions of data. The portions of data may be obtained by other persistent storage devices, data nodes, fault domains, or from the host (100). For additional details regarding the data cluster (110), see, e.g., FIG. 1B.

Figure 1B:
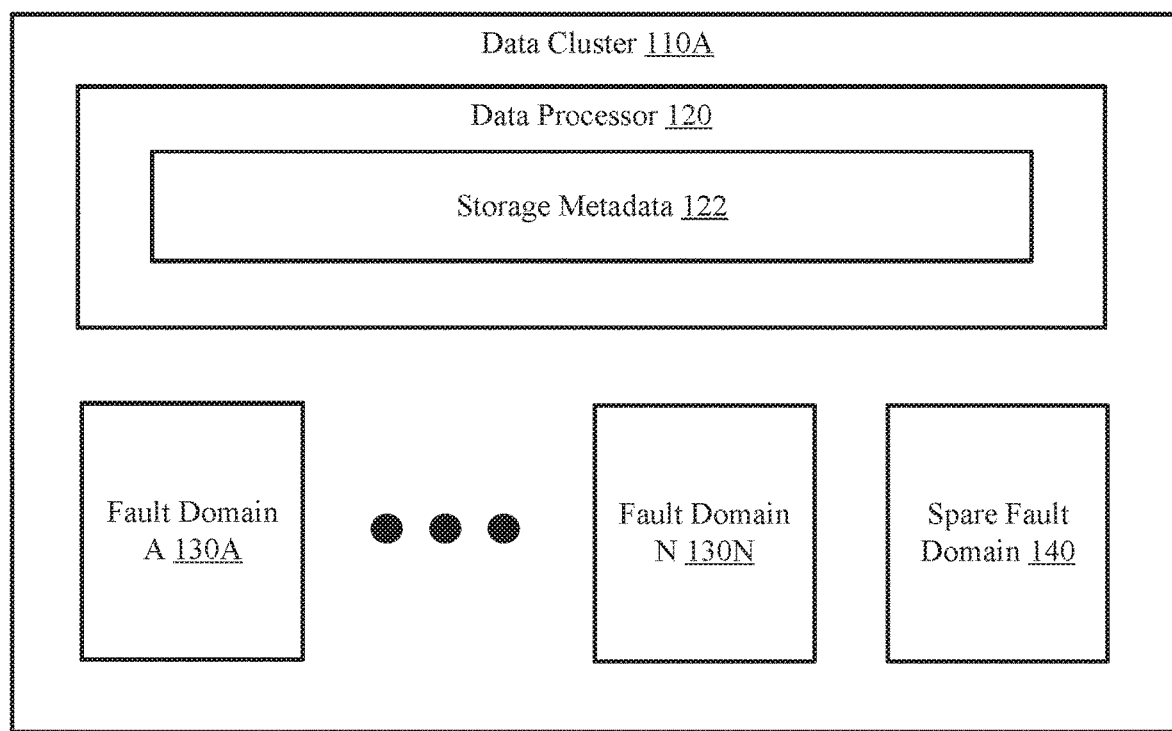
FIG. 1B shows a diagram of a data cluster in accordance with one or more embodiments of the invention.

FIG. 1B shows a diagram of a data cluster (110A) in accordance with one or more embodiments of the invention. The data cluster (110A) may be an embodiment of the data cluster (110, FIG. 1A) discussed above. The data cluster (110A) may include a data processor (120), any number of fault domains (130A, 130N), and a spare fault domain (140). The components of the data cluster (110A) may be operably connected via any combination of wired and/or wireless connections. Each of the aforementioned components is discussed below.

In one or more embodiments of the invention, the data processor (120) is a device (physical or logical) that includes the functionality to perform erasure encoding on data obtained from a host (e.g., 100, FIG. 1A) and manage the storage of the resulting data chunks in the fault domains (e.g., 130A, 130B) of the data cluster. Additionally, in one or more embodiments of the invention, the data processor (120) orchestrates the rebuilding of a failed fault domain using a spare fault domain (140). The data processor (120) may perform the storage management and fault domain rebuilding via the methods illustrated in FIGS. 3A-3B. The data processor (120) may generate, utilize, and update storage metadata (122) as part of its erasure encoding, storage management, and fault domain rebuilding functionality. For additional details regarding the storage metadata (122), refer to FIG. 2.

Figure 3A:
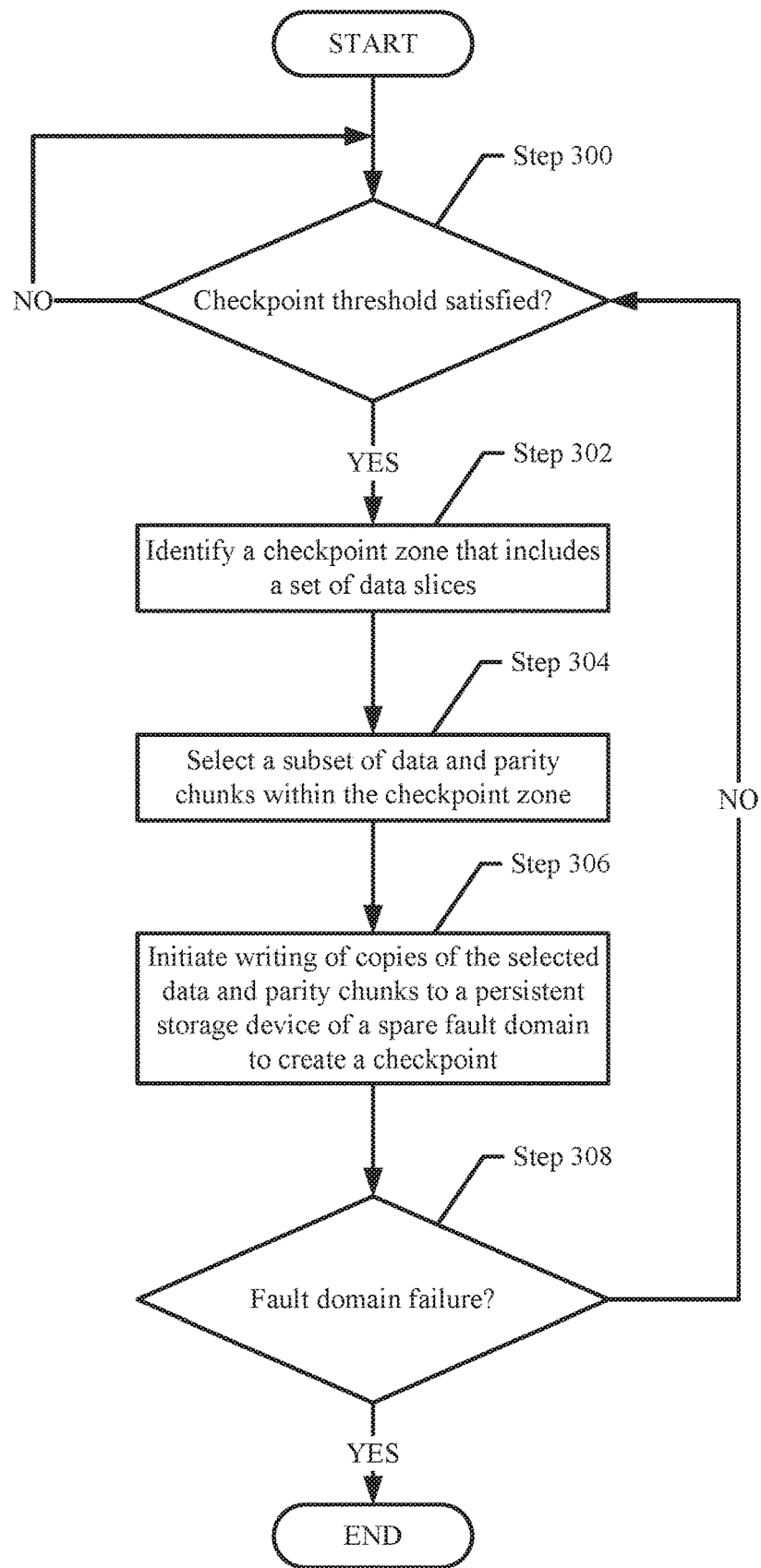
FIG. 3A shows a flowchart for performing a checkpoint zone operation in accordance with one or more embodiments of the invention.
Figure 3B:
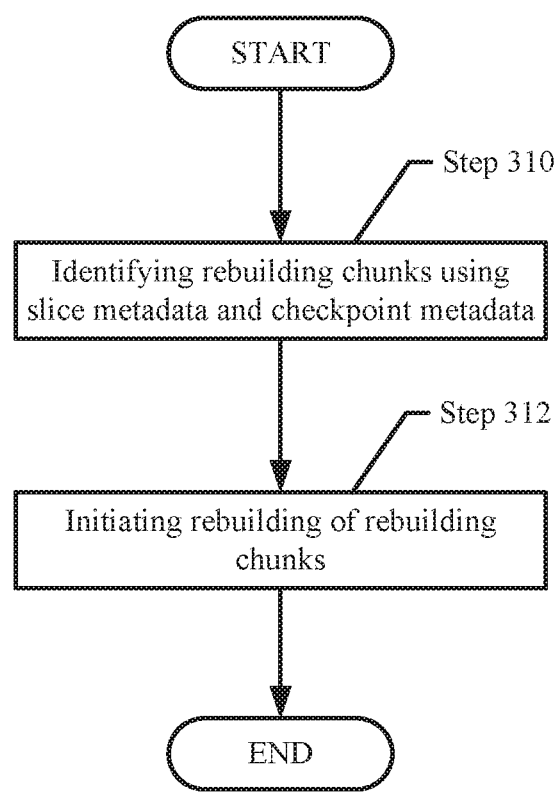
FIG. 3B shows a flowchart for performing a rebuild of a failed fault domain in accordance with one or more embodiments of the invention.

In one or more of embodiments of the invention, the data processor (120) is implemented as computer instructions, e.g., computer code, stored on a persistent storage device of a data node (e.g., 132A, 132N, FIG. 1C) that when executed by a processor of a data node (e.g., 132A, 132N, FIG. 1C) cause the persistent data node (e.g., 132A, 132N, FIG. 1C) to provide the aforementioned functionality of the data processor (120) described throughout this application and/or all, or a portion thereof, of the methods illustrated in FIGS. 3A-3B.

In one or more embodiments of the invention, the data processor (120) is implemented as a computing device (see e.g., FIG. 5), is operatively connected to (but separate from) the data nodes in the fault domains (e.g., 120A, 130N, 140) in the data cluster. The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data processor (120) described throughout this application and/or all, or a portion thereof, of the methods illustrated in FIGS. 3A-3B.

In one or more embodiments of the invention, the data processor (120) is implemented as a logical device. The logical device may utilize the computing resources of any number of computing devices and thereby provide the functionality of the data processor (120) described throughout this application and/or all, or a portion thereof, of the methods illustrated in FIGS. 3A-3B.

In one or more embodiments of the invention, fault domains (130A, 130N) store data obtained from the data processor (120). Fault domains (130A, 130N) may include data nodes that have persistent storage capabilities to store the obtained data.

In one or more embodiments of the invention, a fault domain (e.g., 130A, 130N) is a logical grouping of nodes (e.g., data nodes, not shown) that, when one node of the logical grouping of nodes fails and/or otherwise becomes inaccessible, the other nodes in the same logical grouping of nodes are directly affected. However, nodes in a different fault domain (e.g., 130A, 130N) may be unaffected. Fault domains may use the data nodes to store and rebuild data. For additional information regarding fault domains (130A, 130N) and data nodes, refer to FIGS. 1C and 1D, respectively.

In one or more embodiments of the invention, the spare fault domain (140) stores data in a manner similar to the aforementioned fault domains (130A, 130N). The data may be data chunks and/or parity chunks. However, unlike the aforementioned fault domains (130A, 130N), the spare fault domain (140) is a passive fault domain. In other words, the spare fault domain (140) does not participate in the direct storage of data from the host (e.g., 100, FIG. 1A) like the fault domains (130A, 130N). Instead, the data processor (120) may use the spare fault domain (140) to store data chunks and parity chunks, as well as use the aforementioned stored chunks to rebuild the corresponding chunks on failed fault domains (130A, 130N).

In one or more embodiments of the invention, the spare fault domain (140) is a logical grouping of nodes (e.g., data nodes, not shown) that, when one node of the logical grouping of nodes fails and/or otherwise becomes inaccessible, the other nodes in the same logical grouping of nodes are directly affected. However, nodes in a different fault domain (e.g., 130A, 130N) may be unaffected. Fault domains may use the data nodes store and rebuild data. For additional information regarding fault domains (130A, 130N) and data nodes, refer to FIGS. 1C and 1D, respectively.

The spare fault domain (140) may include more storage capacity than the fault domains (130A, 130N) in order to store larger quantities of data (e.g., data chunks and parity chunks) as a result of checkpoint zone operations and fault domain rebuild operations. For additional information regarding checkpoint zone operations and fault domain rebuild operations, refer to FIG. 3A and FIG. 3B, respectively.

Figure 1C:
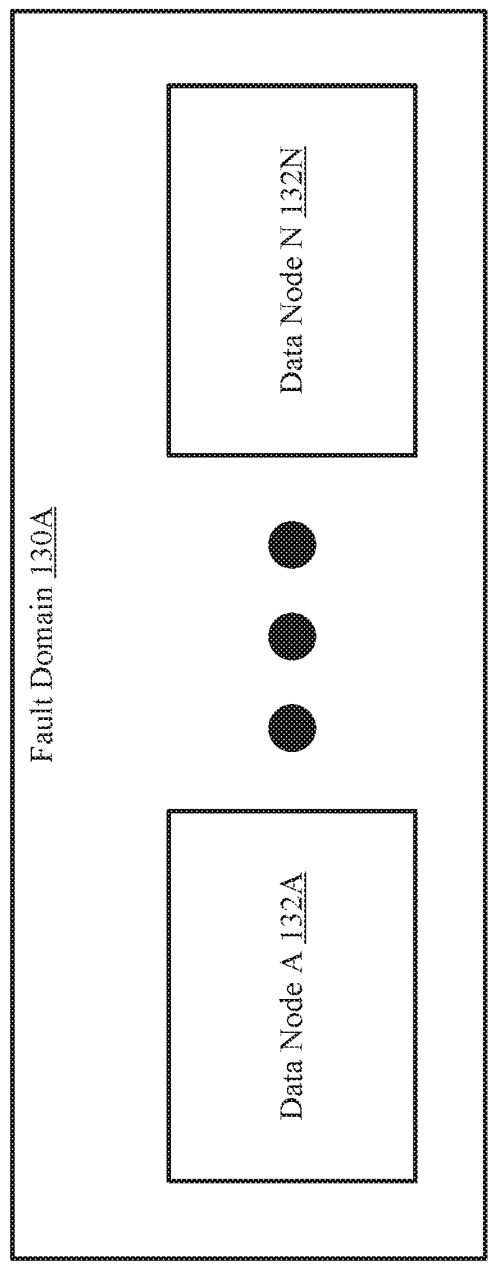
FIG. 1C shows a diagram of a fault domain in accordance with one or more embodiments of the invention.

FIG. 1C shows a diagram of a fault domain in accordance with one or more embodiments of the invention. The fault domain (130A) may be an embodiment of the fault domains (130A, 130N, FIG. 1B) discussed above. Each fault domain (130A) may include one or more data nodes (132A, 132N). Each component of the fault domain (130A) may be operatively connected to each other via wired and/or wireless connections. The fault domain (130A) may have additional, fewer, and/or different components without departing from the invention. Each of the components of the fault domain (130A) is discussed below.

In one or more embodiments of the invention, the data nodes (132A, 132N) store data chunks and parity chunks (as described below) within the fault domain (130A). The data nodes (132A, 132N) may include persistent storage devices (not shown, see e.g., FIG. 1E) that may be used to store the data chunks, parity chunks and storage metadata. The management of the data chunks and parity chunks is described below with respect to FIGS. 3A-3B. For additional details regarding the data nodes (132A, 132N), refer to FIG. 1D.

In one or more embodiments of the invention, each data node (132A, 132N) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, which when executed by the processor(s) of the computing device cause the computing device to perform the functionality of the data node (132A, 132N) described throughout this application.

In one or more embodiments of the invention, each of the data nodes (132A, 132N) is implemented as a logical device. The logical device may utilize the computing resources of any number of computing devices and thereby provide the functionality of the data nodes (132A, 132N) described throughout this application. For additional details regarding the data nodes (132A, 132N), see, e.g., FIG. 1D.

Figure 1D:
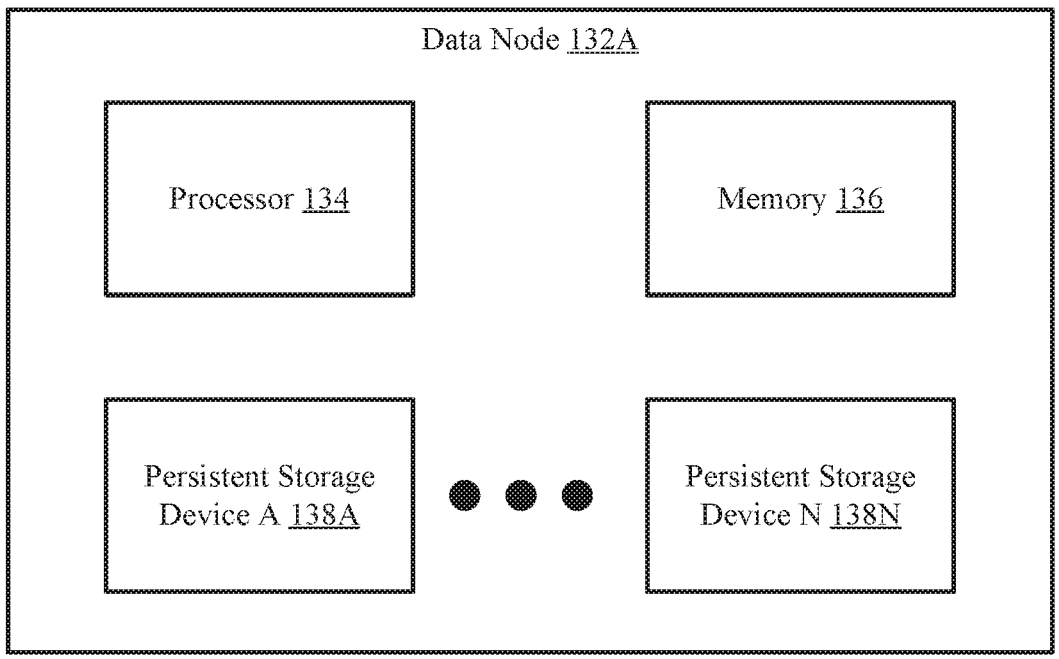
FIG. 1D shows a diagram of a data node in accordance with one or more embodiments of the invention.

FIG. 1D shows a diagram of a data node in accordance with one or more embodiments of the invention. The data node (132A) may be an embodiment of the data nodes (130A, 130N, FIG. 1B) discussed above. Each data node may include a processor (134), memory (136), and one or more persistent storage devices (138A, 138N). If the data node (132A) is within the spare fault domain (e.g., 140, FIG. 1B), the data node (132A) may also include one or more compute acceleration devices (CADs) (not shown). Each component of the data node (132A) may be operatively connected to each other via wired and/or wireless connections. The data node (132A) may have additional, fewer, and/or different components without departing from the invention. Each of the components of the data node (132A) is discussed below.

In one or more embodiments of the invention, the processor (134) is a component that processes data and processes requests. The processor (134) may be, for example, a central processing unit (CPU). The processor (134) may be other types of processors without departing from the invention. The processor (134) may process a request to store data and/or metadata and rebuild data and/or metadata using data stored in memory (136), the persistent storage devices (138A, 138N), and/or other data nodes (e.g., 130N, FIG. 1C). The processor (134) may process other requests without departing from the invention.

In one or more embodiments of the invention, the data node (132A) includes memory (136), which stores data that is more accessible to the processor (134) than the persistent storage devices (138A, 138N). The memory (136) may be volatile storage. Volatile storage may be storage that stores data that is lost when the storage loses power. The memory (136) may be, for example, Random Access Memory (RAM). In one or more embodiments of the invention, a copy of the data and/or parity chunks required for a fault domain rebuilding operation are stored in the memory (136) of the data node (132A).

In one or more embodiments of the invention, the persistent storage devices (138A, 138N) store data and rebuild data. The data may be data chunks and/or parity chunks. The persistent storage devices (138A, 138N) may include non-volatile storage (also referred to as persistent storage). In other words, the data stored in the persistent storage devices (138A, 138N) is not lost or removed when the persistent storage devices (138A, 138N) lose power. For additional details regarding the persistent storage devices, see, e.g., FIG. 1E. In one or more embodiments of the invention, the CADs (not shown) include the functionality to perform all, or a portion of, fault domain rebuild operations initiated by the data processor (120, FIG. 1B). The CADs may also include functionality to store data in persistent storage and/or in the persistent storage devices (138A, 138N). In this manner, the data processor (120, FIG. 1B) is able to process read and write requests, and process data obtained from the host while the CADs (which are in data nodes of the spare fault domain) handle the fault domain rebuild functionality thereby not impacting the read/write performance and the data processing performance of the data processor (120, FIG. 1B).

In one or more embodiments of the invention, a CAD (not shown) is a physical device that includes processing hardware (not shown) and memory (not shown). The CAD may include other elements/components without departing from the invention. The processing hardware may include, but is not limited to, a field-programmable gate array, application specific integrated circuit, programmable processor, microcontroller, digital signal processor, a host bus adapter (HBA) card, other processing hardware, or any combination thereof. Depending on the implementation, the CAD may also include persistent storage that may include computer readable instructions, which may be executed by the processing hardware, to perform all or a portion of the functionality of a CAD device as discussed throughout this application. The memory may be, for example, Random Access Memory (RAM). The memory (or volatile storage) in the CAD may include a copy of the storage metadata (122, FIG. 1B). The processing hardware may be adapted to provide the functionality of the CAD described throughout this application and/or all, or a portion thereof, of the methods illustrated in FIG. 3B.

Figure 1E:
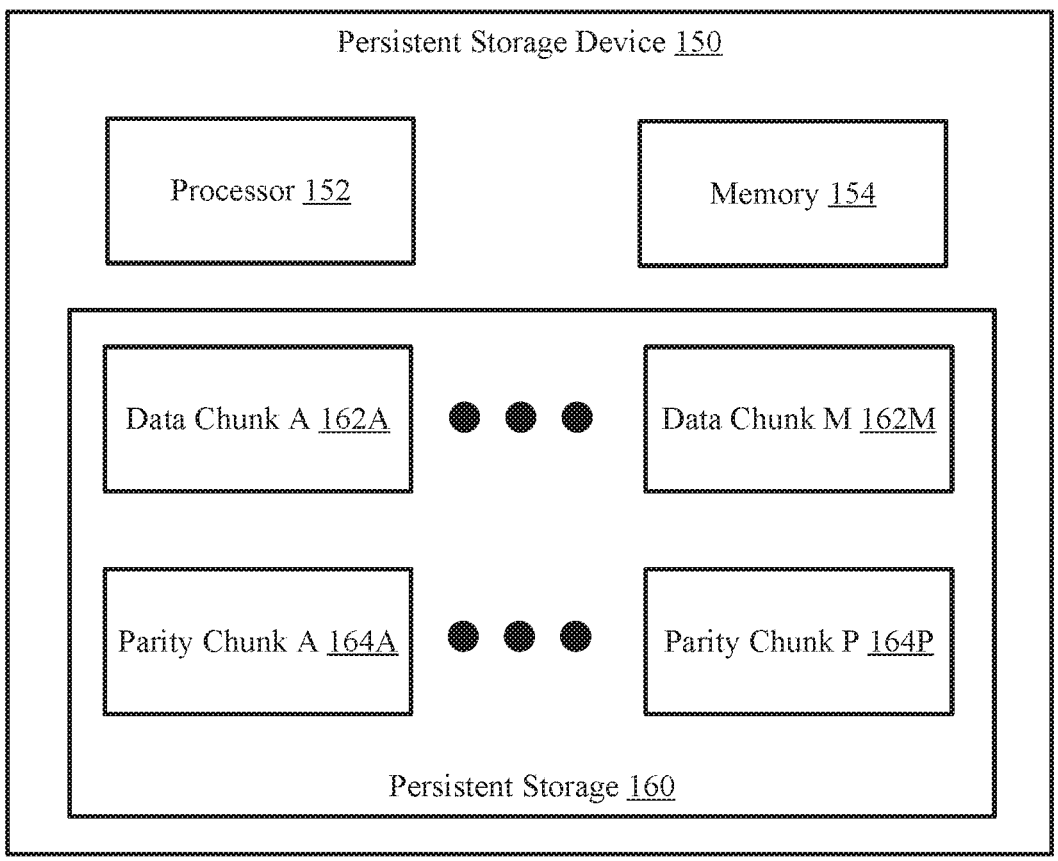
FIG. 1E shows a diagram of a persistent storage device in accordance with one or more embodiments of the invention.

FIG. 1E shows a diagram of a persistent storage device (150) in accordance with one or more embodiments of the invention. The persistent storage device (150) may be an embodiment of a persistent storage device discussed above (136A, 136N, 146B, 146C, 146M) discussed above. As discussed above, the persistent storage device (150) stores and rebuilds data. The data may be data chunks (162A, 162M) and parity chunks (164A, 164P). The persistent storage device (150) may include a processor (152), memory (154), and persistent storage (160). Each of these components is discussed below.

In one or more embodiments of the invention, the processor (152) is a component that processes data and processes requests. The processor (142) may be, for example, a central processing unit (CPU). The processor (152) may be other types of processors without departing from the invention. The processor (152) may process a request to store data and rebuild data using data stored in persistent storage (160) or from other persistent storage devices (e.g., 130A, 130N, FIG. 1B). The processor (152) may process other requests without departing from the invention.

In one or more embodiments of the invention, the persistent storage device (1150) includes memory (154), which stores data that is more accessible to the processor (152) than the persistent storage (160). The memory (154) may be volatile storage. Volatile storage may be storage that stores data that is lost when the storage loses power. The memory (154) may be, for example, Random Access Memory (RAM). In one or more embodiments of the invention, a copy of the data and/or parity chunks required for a persistent storage device rebuilding operation are stored in the memory (154) of the persistent storage device (150).

As discussed above, the persistent storage (160) may store data. The data stored in persistent storage 160) may include data chunks (162A, 162M) and parity chunks (164A, 164P). Each of these data structures is discussed below. The persistent storage (160) may store other and/or additional data without departing from the invention.

The persistent storage (160) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (160) may utilize portions of any combination of hard disk drives, solid state disk drives, tape drives, and/or any other physical storage medium of any number of computing devices.

In one or more embodiments of the invention, a data chunk (162A, 162M) is a data structure that includes a portion of data that was obtained from a host. The data chunks (162A, 162M) may be (but are not required to be) deduplicated by a data processor and obtained by the persistent storage device (150) from the data processor. Each of the data chunks (162A, 162M) may be used by the persistent storage device (150) (or another persistent storage device) to reconstruct another data chunk or a parity chunk based on an erasure coding algorithm that was applied to the other data chunk or parity chunk.

In one or more embodiments of the invention, a parity chunk (164A, 164P) is a data structure that includes a parity value generated using an erasure coding algorithm. The parity value may be generated by applying the erasure coding algorithm to one or more data chunks stored in the persistent storage device (150) or other data nodes. Each of the parity chunks (164A, 164P) may be used by the persistent storage device (150) (or another persistent storage device) to reconstruct another parity chunk or a data chunk based on an erasure coding algorithm that was applied to the other parity chunk or data chunk.

Figure 2:
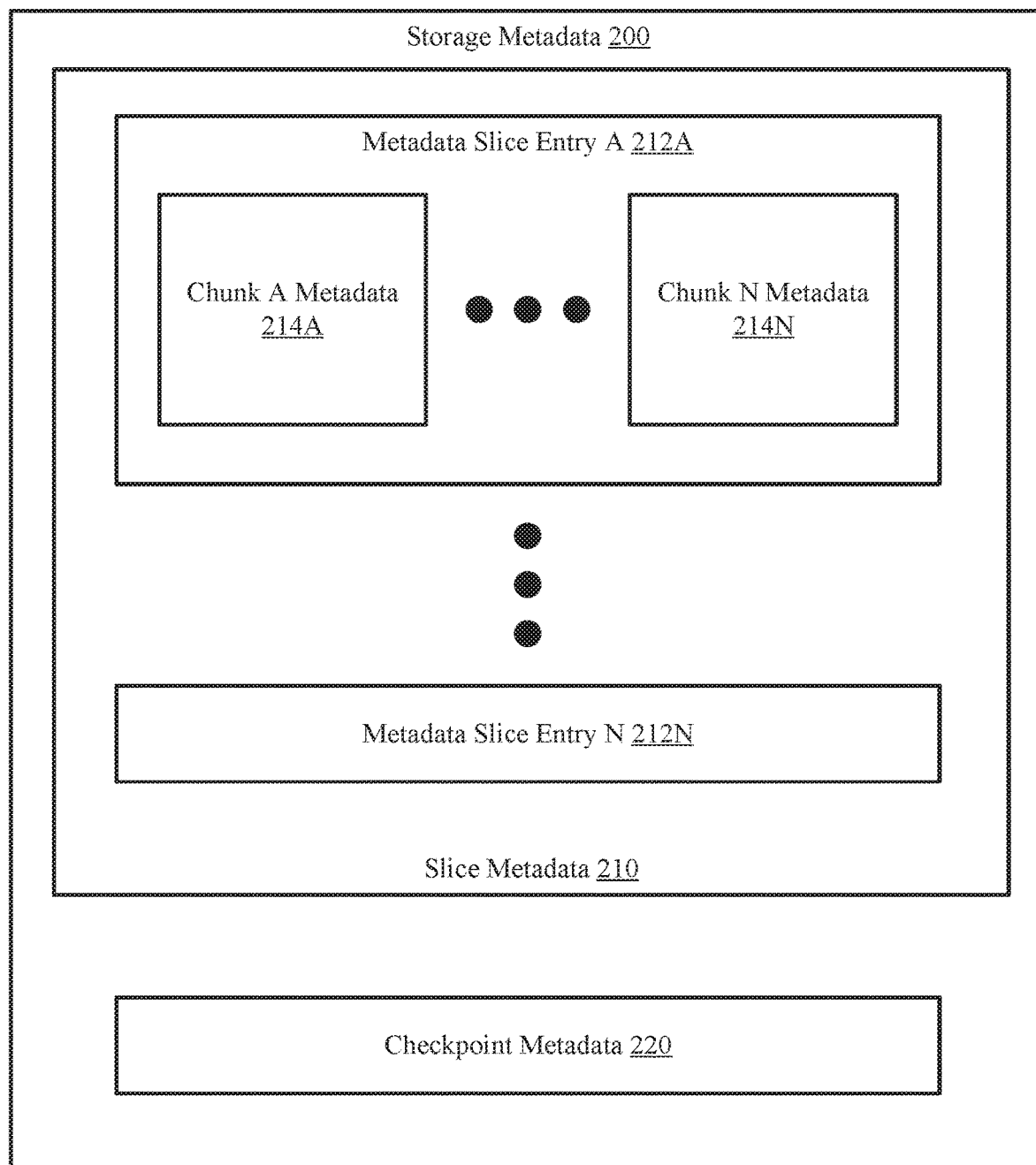
FIG. 2 shows a diagram of storage metadata in accordance with one or more embodiments of the invention.

FIG. 2 shows a diagram of storage metadata in accordance with one or more embodiments of the invention. The storage metadata (200) may be an embodiment of the storage metadata (122, FIG. 1B) discussed above. As discussed above, the storage metadata (200) includes information about data chunks and/or parity chunks (collectively, chunks). The storage metadata may include slice metadata (210) and proactive copy metadata (220). Each of the aforementioned portions of storage metadata (200) is discussed below.

In one or more embodiments of the invention, slice metadata (210) includes metadata associated with data slices. Each data slice may have an associated metadata slice entry (e.g., 212A, 212N) generated by the data processor (120, FIG. 1B) when the data slice was generated and stored across the fault domains (e.g., 130A, 130N, FIG. 1B) in the data cluster (e.g., 110A, FIG. 1B). The metadata slice entry (212A, 212N) includes chunk metadata (214A, 214N). Each chunk of a chunk metadata (214A, 214N) may correspond to metadata for a data chunk or a parity chunk. Each chunk metadata (214A, 214N) may include information about a chunk such as, for example, a unique identifier (e.g., a fingerprint) that may be used to differentiate the chunks stored in the data cluster (110, FIG. 1A), a storage location of the chunk (e.g., the persistent storage device, data node, and fault domain in which the chunk is stored), and a data slice identifier that identifies the data slice in which the chunk is associated. The chunk metadata (214A, 214N) may include other and/or additional information regarding the chunks without departing from the invention.

In one or more embodiments of the invention, checkpoint metadata (220) includes metadata associated with checkpoints created during a checkpoint zone operation. The checkpoint metadata (220) may include information regarding data and/or parity chunks within a checkpoint zone that were selected by the data processor (120, FIG. 1B) to be copied and stored in the spare fault domain (140, FIG. 1B) within a checkpoint. A checkpoint zone may be associated with multiple of data slices from which the data processor (120, FIG. 1B) may select a subset of chunks to copy and send to a spare fault domain during a checkpoint zone operation (see e.g., FIG. 3A). The checkpoint metadata (220) may include chunk identifiers (e.g., a fingerprint) that may be used to differentiate the chunks stored in the data cluster (110, FIG. 1A), data slice identifiers that identify the data slice in which a chunk is associated that are associated with the chunks, and checkpoint zone identifiers that identify the checkpoint zone to which the chunks are associated. The data processor (120, FIG. 1B) may use the checkpoint metadata (220) to rebuild failed fault domains. For additional information regarding checkpoint zone operations and fault domain rebuilding operations, refer to FIGS. 3A and 3B, respectively. The checkpoint metadata (220) may include other and/or additional information without departing from the invention.

FIG. 3A shows a flowchart for performing a checkpoint zone operation in accordance with one or more embodiments of the invention. The method shown in FIG. 3A may be performed by, for example, a data processor (120, FIG. 1B). Other components of the system illustrated in FIG. 1B may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, a determination is made as to whether a checkpoint threshold has been satisfied. In one or more embodiments of the invention, the checkpoint threshold is the minimum amount of data slices stored across the fault domains required in order to generate a checkpoint zone. The data processor may check the number of data slices not already included in previously generated checkpoint zones and compare it with the checkpoint threshold. If the checkpoint threshold is satisfied, the method proceeds to step 302. If the checkpoint threshold is not satisfied, the method performs step 300 again to wait until the checkpoint threshold is satisfied.

In step 302, in response to the determination of step 300 that the checkpoint threshold is satisfied, a checkpoint zone that includes a set of data slices is identified. In one or more embodiments of the invention, the checkpoint zone includes a multiple of data slices. The data slices may include data and parity chunks stored across the fault domains in the data cluster.

The data processor may then generate checkpoint metadata. The checkpoint metadata may include checkpoint zone information associated with the newly identified checkpoint zone. The checkpoint zone information may include, for example, fault domain identifiers associated with the checkpoint zone, data slice identifiers for data slices included in the checkpoint zone, chunk identifiers of data and parity chunks within the checkpoint zone, and chunk storage locations, as discussed above. The checkpoint zone information may include other and/or additional information regarding the identified checkpoint zone without departing from the invention.

In step 304, a subset of data and parity chunks within the checkpoint zone is selected. In one or more embodiments of the invention, the subset of data and parity chunks within the checkpoint zone may be selected in a rotating fashion (e.g., see FIG. 4B). For example, a checkpoint zone may include three data slices stored across three fault domains, wherein each data slice includes two data chunks and one parity chunk. The data processor may select two data chunks from the first data slice in the checkpoint zone stored in the first and second fault domains respectively, a parity chunk and data chunk from the second data slice in the checkpoint zone stored in the second and third fault domains respectively, and a parity chunk and data chunk from the third data slice of the checkpoint zone stored in the first and third fault domains respectively.

The subset of data and parity chunks within the checkpoint zone may be selected via other and/or additional methods without departing from the invention. The subset of data and parity chunks within the checkpoint zone may include a sufficient number of data and parity chunks to rebuild or replace at least one data or parity chunk associated with each fault domain in the checkpoint zone without requiring additional data and/or parity chunks.

After selecting the subset of data and parity chunks within the checkpoint zone, the data processor may update the checkpoint metadata associated with the checkpoint zone to include data and parity chunk information regarding the selected subset of data and parity chunks. The selected subset of data and parity chunk information may include, for example, chunk identifiers and storage locations as discussed above. The selected subset of data and parity chunks may include other and/or additional information regarding the selected subset of data and parity chunks without departing from the invention.

In step 306, the writing of copies of the selected data and parity chunks to a spare fault domain to create a checkpoint is initiated. The data processor may send a request to each fault domain associated with the checkpoint zone to copy and send the selected data and parity chunk copies to the spare fault domain. In response to the request, the fault domains may each copy and send their selected data and/or parity chunks to the spare fault domain. Upon receiving the selected data and parity chunk copies from the fault domains, the spare fault domain may store the selected data and parity chunk copies in persistent storage and associate the selected data and parity chunk copies with each other to create a checkpoint.

In one or more embodiments of the invention, the selected data and parity chunks (i.e., checkpoint data) of a checkpoint zone operation are stored in a single persistent storage device of the spare fault domain. Fault domain rebuild operations may be performed more efficiently with the checkpoint data stored in a single persistent storage device as no data chunk movement is required to rebuild at least one chunk associated with a failed fault domain that is not included in the checkpoint data.

After creating a checkpoint, the spare fault domain may send confirmation to the data processor. The confirmation may include checkpoint information. The checkpoint information may include a checkpoint identifier, chunk identifiers, and/or chunk storage locations within the spare fault domain as discussed above. The data processor may update the checkpoint metadata to include the checkpoint information.

In step 308, a determination is made as to whether a fault domain has failed. In one or more embodiments of the invention, the data processor may attempt to store data on a fault domain and may receive an error that the fault domain has failed. Failure of a fault domain may be detected using other mechanisms without departing from the invention. If a fault domain has failed, the method ends following step 308. If a fault domain has not failed, the method proceeds to step 300.

The method may end following step 308.

FIG. 3B shows a flowchart for performing a rebuild of a failed fault domain in accordance with one or more embodiments of the invention. The method shown in FIG. 3B may be performed by, for example, a data processor (120, FIG. 1B). Other components of the system illustrated in FIG. 1B may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Continuing with the discussion of FIG. 3B, in step 310, rebuilding chunks are identified using slice metadata and checkpoint metadata. The data processor may use the slice metadata to identify all of the data and parity chunks stored in the failed fault domain. The data processor may use the checkpoint metadata to identify all of the chunks associated with the failed fault domain that are already stored in the spare fault domain. The data processor may compare all the data chunks stored on the failed fault domain with the chunks associated with the failed fault domain stored in the spare fault domain to identify the rebuilding chunks. The rebuilding chunks may refer to data and/or parity chunks that need to be rebuilt to complete the rebuilding of the failed fault domain.

In step 322, the rebuilding of rebuilding chunks is initiated. The data processor may send a request to the spare fault domain to rebuild the rebuilding chunks locally using chunks obtained during previous checkpoint zone operations. This may be a quick operation as all chunks stored in the spare fault domain associated with a checkpoint are stored within a single persistent storage device. Therefore, no chunk movement may be required to locally rebuild at least one of the chunks associated with the failed persistent storage device. The request may include which chunks to use to rebuild the rebuilding chunks and the algorithm to use to rebuild the building chunks.

In one embodiment of the invention, the spare fault domain may not be able to rebuild the rebuilding chunks using only the data and/or parity chunks already stored in the spare fault domain as a result of the checkpoint zone operation. Therefore, the rebuilding chunks may require data and/or parity chunks not stored on the spare fault domain. The data processor may use slice metadata to identify the fault domains in which the data and/or parity chunks required to rebuild the rebuilding chunks are stored. The data processor may then send requests to the fault domains to copy and send the chunks required to rebuild the rebuilding chunks to the spare fault. The data processor may then send a request to the spare fault domain to rebuild the rebuilding chunks. After completing the rebuild of the rebuilding chunks, the spare fault domain may delete the chunks that are not associated with the failed fault domain.

In one or more embodiments of the invention, the data nodes of the spare fault domain include one or more CADs. The data processor may then initiate a fault domain rebuild operation using at least one of the CADs. The CADs may then perform the fault domain rebuild operation by rebuilding the rebuilding chunks locally using chunks obtained during checkpoint zone operations, obtaining chunks from other fault domains required for the rebuilding chunks, and rebuilding the rebuilding chunks using the chunks obtained from other fault domains. The data processor may resume checkpoint zone operations and/or other storage management operations without needing to manage the fault domain rebuilding operation.

The method may end following step 322.

Example

Figure 4A:
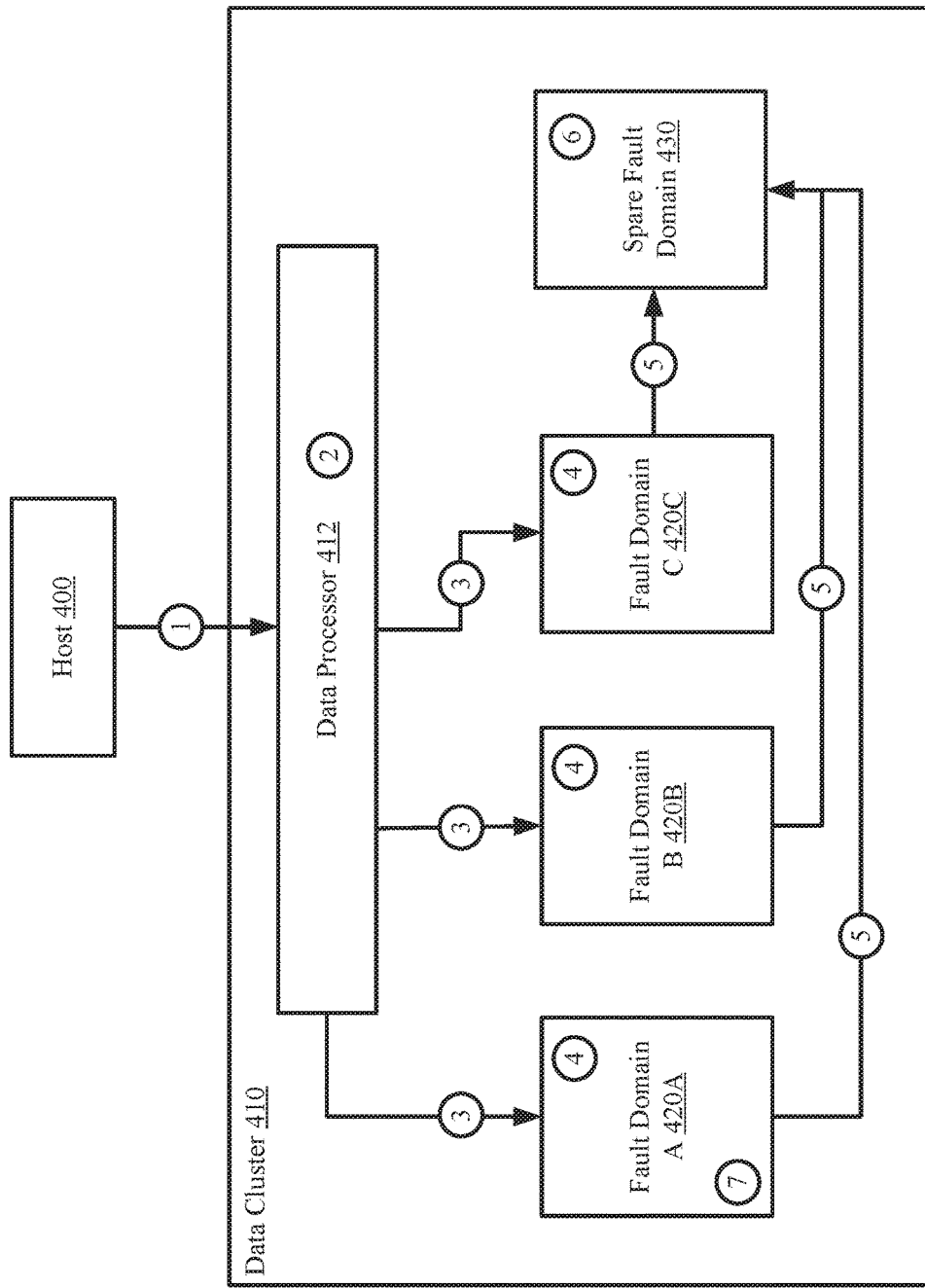
FIGS. 4A-4C show an example in accordance with one or more embodiments of the invention.
Figure 4B:
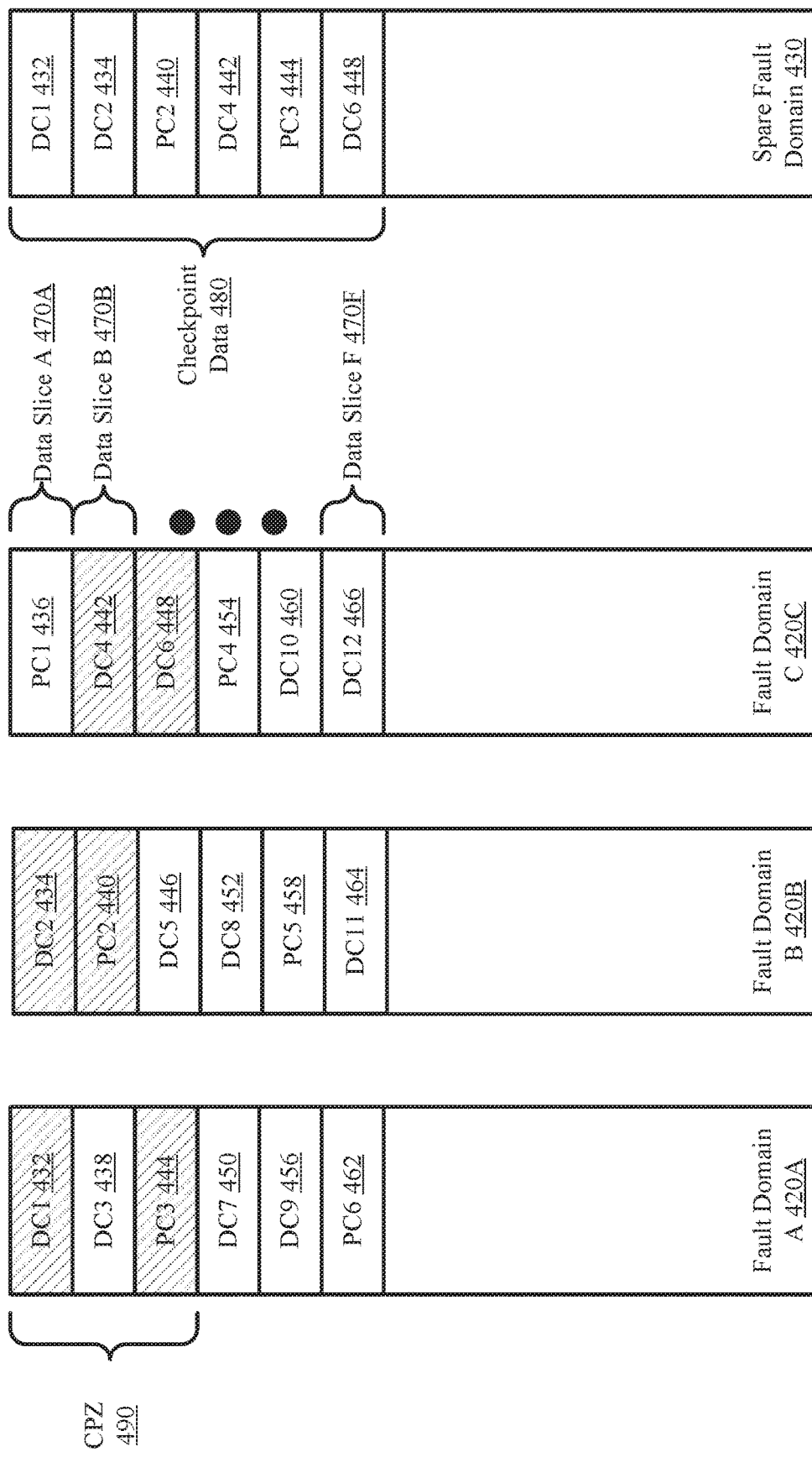
Figure 4C:
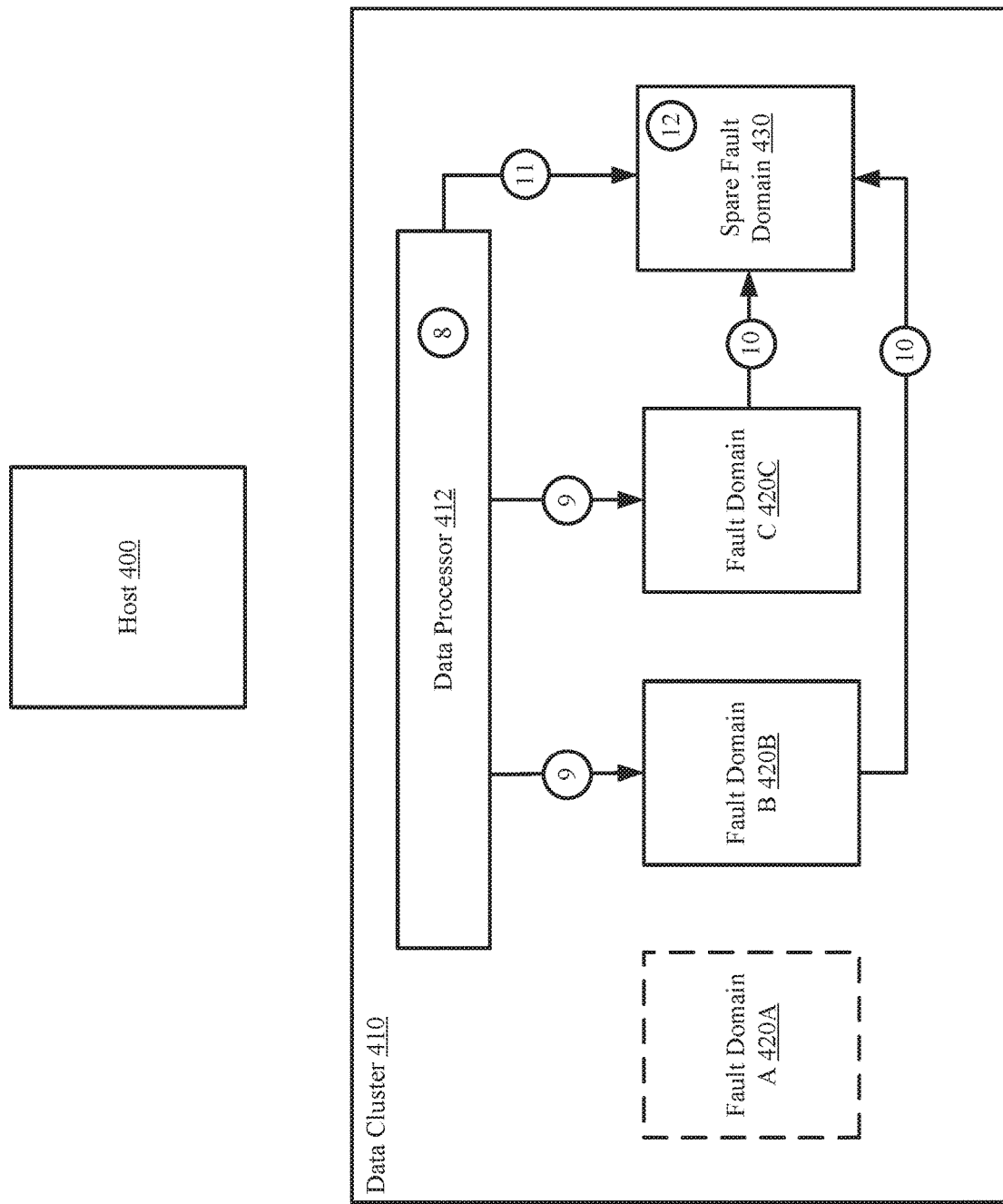

The following section describes an example. The example is not intended to limit the invention. FIGS. 4A-4C show an example in accordance with one or more embodiments of the invention. Turning to the example, consider a scenario in which a data cluster obtains data from a host. The data is a file. The host requests the file to be stored in the data cluster using a 2:1 erasure coding procedure. FIG. 4A shows a diagram of a system in accordance with one or more embodiments of the invention. The host (400) sends the request to a data processor (412) of a data cluster (410) [1]. The data processor (412) performs an erasure coding on the file, breaking the file into data and parity chunks (not shown) [2]. The data processor then sends the chunks to each of the fault domains (420A, 420B, 420C) in which they are stored [3]. The chunks are stored in data slices (not shown), wherein each slice includes two data chunks and one parity chunk. Each chunk in the data slice is stored in a separate fault domain (420A, 420B, 420C). For additional details regarding how the chunks are stored, refer to FIG. 4B.

The data processor (412) then performs a checkpoint zone operation (the method depicted in FIG. 3A). Specifically, the data processor (412) identifies a checkpoint zone (not shown) that includes a multiple of data slices stored across the fault domains (420A, 420B, 420C) [4]. The data processor (412) then selects a subset of data and parity chunks included in checkpoint zone and requests the fault domains (420A, 420B, 420C) to copy and send the selected data and parity chunks to the spare fault domain (430). Upon receiving the requests, the fault domains (420A, 420B, 420C) copy and send the selected data and/or parity chunks to the spare fault domain (430) [5]. The spare fault domain (430) generates a checkpoint by storing the obtained chunks [6]. For additional information regarding the checkpoint zone, selected subset of data and parity chunks, and the checkpoint, refer to FIG. 4B. After generating the checkpoint, fault domain A (420A) fails [7].

FIG. 4B shows a second diagram of the example system at the instant before fault domain A (420A) fails. FIG. 4B provides an overview of all the data stored in the data cluster at that instant. Each fault domain (420A, 420B, 420C) includes data and parity chunks. Specifically, fault domain A (420A) includes DC1 (data chunk one (432)), DC3 (438), PC3 (parity chunk three (444)), DC7 (450), DC9 (456), and PC6 (462). Fault domain B (420B) includes DC2 (434), PC2 (440), DC5 (446), DC8 (452), PC5 (458), and DC11 (464). Fault domain C (420C) includes PC1 (436), DC4 (442), DC6 (448), PC4 (454), DC10 (460), and DC12 (466).

Additionally, each fault domain (420A, 420B, 420C) includes a data or parity chunk of each data slice (e.g., 470A, 470B, 470F). For example, data slice A (470A) includes DC1 (432), DC2 (434), and PC1 (436). DC1 (432) is stored in fault domain A (420A), DC2 (434) is stored in fault domain B (420B), and PC1 (436) is stored in fault domain C (420C). Data slice B (470B) includes DC3 (438), PC2 (440), and DC4 (442). DC3 (438) is stored in fault domain A (420A), PC2 (440) is stored in fault domain B (420B), and DC4 (442) is stored in fault domain C (420C). Similarly, each data slice up to and including data slice F (470F) is stored in this configuration as shown in FIG. 4B.

During the example checkpoint zone operation depicted in FIG. 4A, a CPZ (checkpoint zone) (490) was identified. The CPZ includes three of the six data slices stored across the fault domains. The data processor then selected a subset of chunks (depicted with the cross-hatching pattern) included in the CPZ in a rotating fashion. The subset of chunks include DC1 (432) and DC2 (434) from data slice A (470A), PC2 (440) and DC4 (442) from data slice B (470B), and PC3 (444) and DC6 (448) from data slice C (not shown). As discussed above, the data processor sends requests to the fault domains (420A, 420B, 420C) to copy and send the selected subset of chunks within the identified CPZ (490) to the spare fault domain (430). Checkpoint data (480) includes the copies of the selected subset of chunks within the CPZ obtained from the fault domains (420A, 420B, 420C) that are stored in the spare fault domain (430) within a checkpoint.

FIG. 4C shows a third diagram of the example system. Continuing with the example, after fault domain A (420A) fails (depicted with a dashed-line outline), the data processor (412) identifies the rebuilding chunks required to complete the rebuild of fault domain A (420A) [8]. In this example, DC3 (438, FIG. 4B), DC7 (450, FIG. 4B), DC9 (456, FIG. 4B) and PC6 (462, FIG. 4B) need to be rebuilt and are identified as the rebuilding chunks as all other chunks originally stored in fault domain A (420A) were already copied and stored in the spare fault domain (430) via the checkpoint zone operation shown in FIG. 4A.

In order to rebuild DC7 (450, FIG. 4B), DC9 (456, FIG. 4B) and PC6 (462, FIG. 4B), the spare fault domain (430) needs the other chunks included in the respective data slices. More specifically, the spare fault domain (430) needs DC8 (452, FIG. 4B) stored in fault domain B (420B) and PC4 (454, FIG. 4B) stored in fault domain C (420C) to rebuild DC7 (450, FIG. 4B). The spare fault domain (430) also needs PC5 (458, FIG. 4B) stored in fault domain B (420B) and DC10 (460, FIG. 4B) stored in fault domain C (420C) to rebuild DC9 (460, FIG. 4B). Finally, the spare fault domain (430) needs DC11 (464, FIG. 4B) stored in fault domain B (420B) and DC12 (466, FIG. 4B) stored in fault domain C (420C) to rebuild PC6 (462, FIG. 4B).

In this case, the data processor (412) sends a request to fault domain B (420B) and fault domain C (420C) to copy and send the required chunks (described above) needed to rebuild the rebuilding chunks to the spare fault domain (430) [9]. In response to the requests, fault domain B (420B) and fault domain C (420C) copy and send the required chunks to the spare fault domain (430) [10].

The spare fault domain (430) already includes the required chunks (PC2 (440, FIG. 4C) and DC4 (442, FIG. 4C)) from data slice B (470B, FIG. 4C) needed to rebuild DC3 (438, FIG. 4C) as a result of the earlier checkpoint zone operation depicted in FIG. 4A. The data processor (412) sends a request to the spare fault domain (430) to rebuild the rebuilding chunks [11]. In response to the request, the spare fault (430) rebuilds the rebuilding chunks and deletes all of the chunks not associated with fault domain A (420A) [12].

End of Example

As discussed above, embodiments of the invention may be implemented using computing devices. FIG. 5 shows a computing system in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of storing data and the efficiency of rebuilding data in a data cluster. In one embodiment of the invention, the reliability and efficiency is improved by performing checkpoint zone operations in a manner that copies and sends a subset of data stored in fault domains to a spare fault domain of a data cluster in the background of data storage operations with minimal impact on the performance of the data storage operations of the data cluster. The checkpoint zone operations enable a spare fault domain to obtain data from fault domains in a data cluster before a fault domain fails. Upon a fault domain failure, the spare fault domain uses the previously obtained data to rebuild and/or replace, at least a portion of, the data stored within the failed fault domain.

In traditional data clusters, after a fault domain failure, the spare fault domain obtains associated data from healthy fault domains in the data cluster and must use the obtained data to rebuild the entirety of the data that was stored on the failed fault domain. Embodiments of the invention improve the traditional data clusters by preemptively copying data from fault domains to a spare fault domain prior to a fault domain failure via checkpoint zone operations. As a result, the latency and computational efficiency required to rebuild a failed fault domain on a spare fault domain in a data cluster are improved.

Thus, embodiments of the invention may address the problem of inefficient use of computing resources. This problem arises due to the technological nature of the environment in which data is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing data, the method comprising:
    detecting a fault domain failure in a fault domain of a plurality of fault domains; and
    in response to the detecting, initiating a rebuilding of data in a spare fault domain using checkpoint metadata and slice metadata, wherein the data is a copy of data that was stored in the fault domain and wherein the spare fault domain is not one of the plurality of fault domains,
    wherein prior to detecting the fault domain failure:
        identifying a checkpoint zone, wherein the checkpoint zone comprises chunks stored across the plurality of fault domains;
        selecting a subset of the chunks, wherein the checkpoint metadata is based on the selected subset of the chunks; and
        initiating writing of copies of the subset of the chunks to the spare fault domain.

2. The method of claim 1, wherein the subset of the chunks comprises at least one data chunk and at least one parity chunk.

3. The method of claim 1, wherein the subset of the chunks comprises at least one chunk from each of the plurality of fault domains.

4. The method of claim 1,
    wherein the checkpoint zone comprises a plurality of slices,
    wherein each of the chunks is associated with one of the plurality of slices; and
    wherein a cardinality of the plurality of slices is based on a checkpoint threshold.

5. The method of claim 4, wherein at least one chunk associated with each of the plurality of slices is a parity chunk.

6. The method of claim 5, wherein the slice metadata specifies which of the chunks are associated with each of the plurality of slices.

7. A system, comprising:
    a processor;
    a data processor, which when executed by the processor performs a method, the method comprising:
        detecting a fault domain failure in a fault domain of a plurality of fault domains; and
        in response to the detecting, initiating a rebuilding of data in a spare fault domain using checkpoint metadata and slice metadata, wherein the data is a copy of data that was stored in the fault domain and wherein the spare fault domain is not one of the plurality of fault domains,
        wherein prior to detecting the fault domain failure:
            identifying a checkpoint zone, wherein the checkpoint zone comprises chunks stored across the plurality of fault domains;
            selecting a subset of the chunks, wherein the checkpoint metadata is based on the selected subset of the chunks; and
            initiating writing of copies of the subset of the chunks to the spare fault domain.

8. The system of claim 7, wherein the subset of the chunks comprise at least one data chunk and at least one parity chunk.

9. The system of claim 7, wherein the subset of the chunks comprises at least one chunk from each of the plurality of fault domains.

10. The system of claim 7,
    wherein the checkpoint zone comprises a plurality of slices,
    wherein each of the chunks is associated with one of the plurality of slices; and
    wherein a cardinality of the plurality of slices is based on a checkpoint threshold.

11. The system of claim 10, wherein at least one chunk associated with each of the plurality of slices is a parity chunk.

12. The system of claim 11, wherein the slice metadata specifies which of the chunks are associated with each of the plurality of slices.

13. A non-transitory computer readable medium comprising computer readable program code, which when executed by a computer processor enables the computer processor to perform a method, the method comprising:
    detecting a fault domain failure in a fault domain of a plurality of fault domains; and
    in response to the detecting, initiating a rebuilding of data in a spare fault domain using checkpoint metadata and slice metadata, wherein the data is a copy of data that was stored in the fault domain and wherein the spare fault domain is not one of the plurality of fault domains,
    wherein prior to detecting the fault domain failure:
        identifying a checkpoint zone, wherein the checkpoint zone comprises chunks stored across the plurality of fault domains;
        selecting a subset of the chunks, wherein the checkpoint metadata is based on the selected subset of the chunks; and
        initiating writing of copies of the subset of the chunks to the spare fault domain.

14. The non-transitory computer readable medium of claim 11, wherein the subset of the chunks comprise at least one data chunk and at least one parity chunk.

15. The non-transitory computer readable medium of claim 13, wherein the subset of the chunks comprises at least one chunk from each of the plurality of fault domains.

16. The non-transitory computer readable medium of claim 13,
    wherein the checkpoint zone comprises a plurality of slices,
    wherein each of the chunks is associated with one of the plurality of slices; and
    wherein a cardinality of the plurality of slices is based on a checkpoint threshold.

17. The non-transitory computer readable medium of claim 16, wherein at least one chunk associated with each of the plurality of slices is a parity chunk.

* * * * *